(12) United States Patent
Greason

(10) Patent No.: US 11,077,938 B1
(45) Date of Patent: Aug. 3, 2021

(54) ROTATION-STABILIZED BEAMED-ENERGY RECEIVER, AND ASSOCIATED SYSTEMS AND METHODS

(71) Applicant: Electric Sky Holdings, Inc., Mercer Island, WA (US)

(72) Inventor: Jeffrey Greason, Midland, TX (US)

(73) Assignee: Electric Sky Holdings, Inc., Mercer Island, WA (US)

( * ) Notice: Subject to any disclaimer, the term of this patent is extended or adjusted under 35 U.S.C. 154(b) by 726 days.

(21) Appl. No.: 15/870,547

(22) Filed: Jan. 12, 2018

Related U.S. Application Data

(60) Provisional application No. 62/446,325, filed on Jan. 13, 2017.

(51) Int. Cl.
| | |
|---|---|
| *B64C 39/00* | (2006.01) |
| *F03H 99/00* | (2009.01) |
| *B64G 1/40* | (2006.01) |
| *B64C 27/32* | (2006.01) |
| *B64D 27/16* | (2006.01) |
| *H02J 50/20* | (2016.01) |
| *B64C 27/24* | (2006.01) |
| *B64C 27/52* | (2006.01) |

(52) U.S. Cl.
CPC .............. *B64C 27/32* (2013.01); *B64C 27/24* (2013.01); *B64C 27/52* (2013.01); *B64C 39/001* (2013.01); *B64D 27/16* (2013.01); *F03H 99/00* (2013.01); *H02J 50/20* (2016.02); *B64G 1/409* (2013.01)

(58) Field of Classification Search
CPC ........ B64C 39/001; B64G 1/409; F03H 99/00
See application file for complete search history.

(56) References Cited

U.S. PATENT DOCUMENTS

| | | | | |
|---|---|---|---|---|
| 2,939,648 A | * | 6/1960 | Fleissner | B64C 39/001 244/12.2 |
| 3,114,517 A | * | 12/1963 | Brown | B64G 1/409 244/171.1 |
| 5,058,833 A | * | 10/1991 | Carmouche | B64G 1/409 244/158.1 |
| 5,305,974 A | * | 4/1994 | Willis | F42B 6/006 244/171.5 |
| 5,676,333 A | | 10/1997 | Rethorst | |
| 6,488,233 B1 | * | 12/2002 | Myrabo | B64C 39/001 244/51 |
| 8,511,612 B2 | | 8/2013 | Kremeyer | |
| 9,920,706 B1 | * | 3/2018 | Yavid | F01B 17/02 |

(Continued)

OTHER PUBLICATIONS

Lu et al., Rotating Detonation Wave Propulsion: Experimental Challenges, Modeling, and Engine Concepts, Journal of Propulsion and Power, vol. 30, No. 5, Sep.-Oct. 2014, 18 pages.

(Continued)

*Primary Examiner* — Brian M O'Hara
(74) *Attorney, Agent, or Firm* — Perkins Coie LLP

(57) ABSTRACT

A rotation-stabilized beamed-energy receiver, and associated systems and methods, including an aircraft carrying a rotating electromagnetic energy receiver that, when rotated, is supported by centripetal force in a selected shape and/or orientation. Accordingly, the receiver can be made from very thin and/or otherwise lightweight/flexible materials, while performing an energy-receiving function.

19 Claims, 3 Drawing Sheets

(56) References Cited

U.S. PATENT DOCUMENTS

2014/0013724 A1* 1/2014 Fetta ............... F03H 99/00
                                                     60/203.1
2020/0039646 A1* 2/2020 Fuller ............... B64C 39/062

OTHER PUBLICATIONS

Seebass et al., "Sonic Boom Minimization," Paper presented at the RTO AVT Course on Fluid Dynamics Research on Supersonic Aircraft, Rhode-Saint-Genese, Belgium, May 25-29, 1998, 13 pages.
Wu et al., An Analytical Theory of Heated Duct Flows in Supersonic Combustors, Theoretical and Applied Mechanics Letters, 2014, 5 pages.

* cited by examiner

Direction of Motion
Scale 1 :5

ROTATION-STABILIZED BEAMED-ENERGY RECEIVER, AND ASSOCIATED SYSTEMS AND METHODS

CROSS-REFERENCE TO RELATED APPLICATION

The present application claims priority to U.S. Provisional Application 62/446,325, filed on Jan. 13, 2017, and incorporated herein by reference.

TECHNICAL FIELD

The present technology relates generally to rotation of a receiver for beamed energy on an aircraft to provide stabilization to the receiver, as well as using the rotating receiver for lift and propulsion, and associated systems and methods.

BACKGROUND

There have been various attempts to transmit electromagnetic energy to an aircraft to power the aircraft. However, a challenge associated with such techniques has been to develop a system that is capable of transmitting and receiving enough power to propel the aircraft, without increasing the weight of the aircraft to the point that it is no longer practical.

Accordingly, there remains a need for a practical way to transmit, from the ground or space to an aircraft, energy sufficient to propel the aircraft, in a weight-efficient manner.

DETAILED DESCRIPTION

Spin Stabilization to Reduce Receiver Mass

Embodiments of the presently-disclosed technology include rotating a receiver on-board an aircraft, and using the centrifugal force of rotation to at least partially support the receiver. Put another way, the receiver is at least partially stabilized against flight loads by the centrifugal forces acting on the spinning receiver. This approach can allow a significant reduction of the mass of the receiver.

In at least some embodiments, the receiver can be used to bring enough power onboard the aircraft to propel the aircraft in forward flight. Because this amount of power requires a large receiver, the ability to reduce the weight of the receiver (so as not to overload the aircraft) is beneficial.

The mass of the rotating receiver and rotation mechanism can be far less than the mass of a comparably-sized receiver that supports its own weight without rotation. For example, the weight of an airframe is typically more than ten pounds of weight per square foot of structure. An extremely light airframe such as a hang glider can approach one pound of weight per square foot of structure. The weight of a receiver for an aircraft is dominated by the receiver's supporting structure. Using the presently disclosed technology to spin the receiver to stabilize it against flight loads, the receiver can be formed from a thin plastic film and/or other suitable materials, and can have a weight approaching or even less than 0.1 pounds per square foot of structure, enabling a much larger receiver of practical weight aboard an aircraft.

Representative Vehicle

Figure 1B:
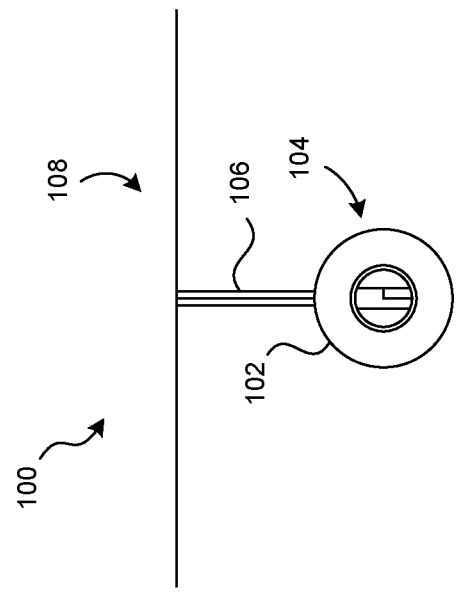
FIG. 1B is a partially schematic, end view of an embodiment of the vehicle shown in FIG. 1A.
Figure 1A:
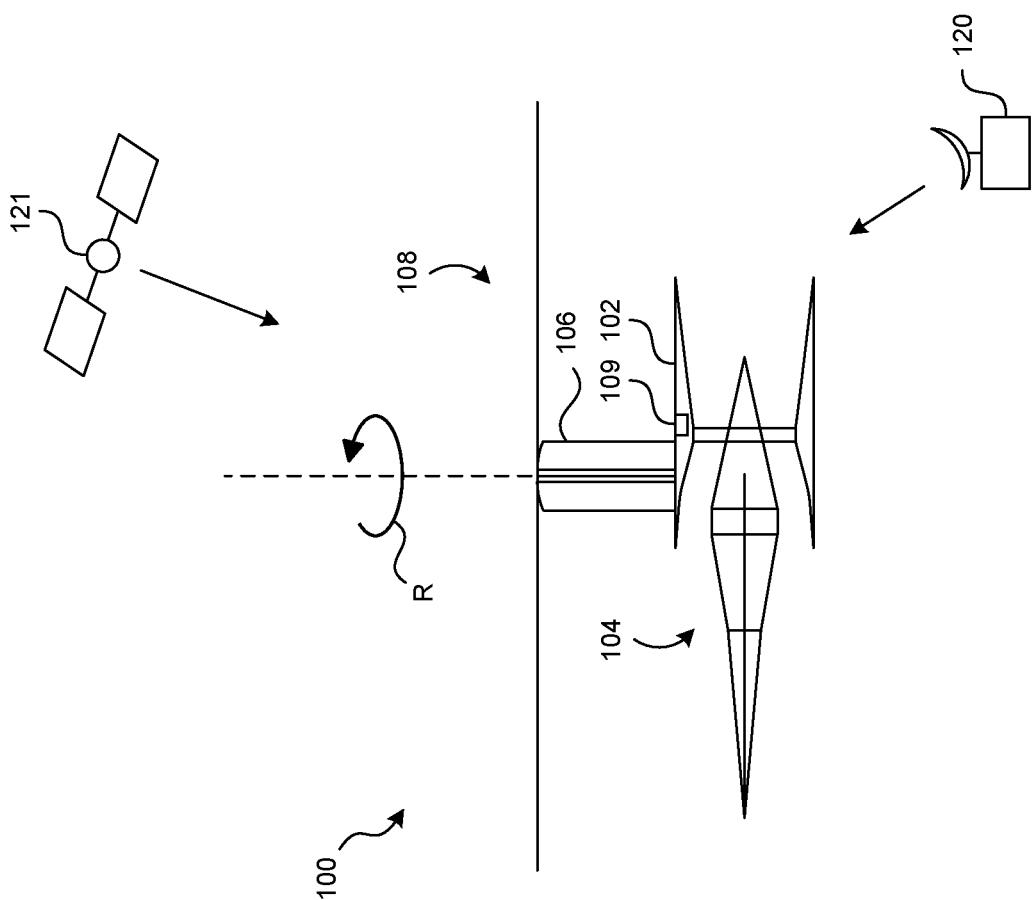
FIG. 1A is a partially schematic, side elevation view of a vehicle having a rotatable receiver configured in accordance with some embodiments of the present technology.

FIG. 1A is a partially schematic, side view illustration of a representative vehicle 100 configured in accordance with embodiments of the present technology. The vehicle 100 can include a fuselage 102 (which may be larger in other embodiments) and a propulsion system 104. The propulsion system 104 can use expansion of electromagnetically heated supersonic flows to provide efficient, high speed propulsion for the vehicle, and/or can use other high-energy techniques that benefit from receiving large amounts of energy from off-board the vehicle 100.

To receive the energy, the vehicle 100 can further include a receiver 108 and a receiver support 106. The receiver 108 can be configured to receive electromagnetic energy beamed toward the vehicle 100 from a ground-based system 120 and/or from a satellite or other space-based system 121. The energy can then be used to heat a reaction mass at the propulsion system 104 to provide thrust for the vehicle 100. The receiver 108 can spin about a rotation axis R, creating centrifugal force that supports or at least partially supports the receiver in a desired configuration and/or orientation. For example, the receiver 108 can be maintained in a generally horizontal plane as shown in FIG. 1A, and can be supported in other planes in other embodiments, for example, to control the vehicle 100. Operation of the vehicle 100 is controlled by an on-board controller 109, and/or by one or more off-board controllers. Accordingly, the vehicle 100 can be controlled solely by an onboard controller (autonomously or via pilot input), solely by a ground-based or other off-board controller, and/or via any suitable combination of on-board/off-board controllers.

FIG. 1B is a partially schematic, end view illustration of the vehicle 100 shown in FIG. 1A. The vehicle 100 can provide lift via the receiver 108, as described further below, in addition to or in lieu of providing lift via an additional lifting surface, e.g., that extends from or is part of the fuselage 104. Such a lifting surface will be positioned so as not to interfere with energy directed from above or below to the receiver 108.

Rotating Receiver can Provide Downward Thrust

Figure 2:
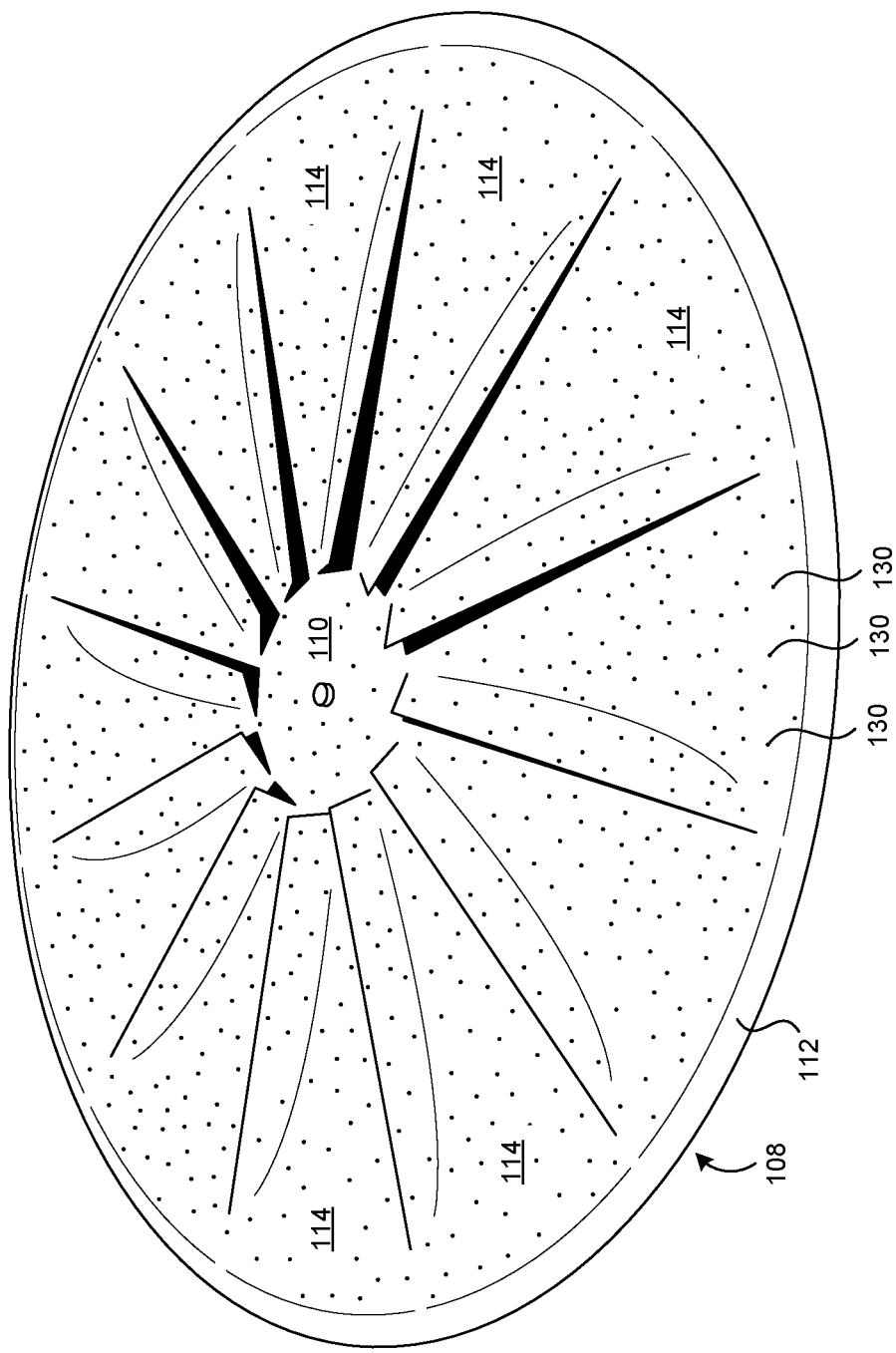
FIG. 2 is an isometric view of a model illustrating receiver segments that may be twisted or otherwise moved to provide multiple configurations, in accordance with some embodiments of the present technology.

FIG. 2 shows a model of a representative receiver 108 configured in accordance with an embodiment of the present technology. In one aspect of this embodiment, the receiver 108 includes a central hub 110 and an outwardly positioned rim 112. The receiver 108 can include multiple receiver segments 114, which can be movable or at least partially movable relative to the hub 110. Each receiver segment 114 can be formed from a thin, lightweight material (e.g., Kapton) that has limited rigidity and strength unless the receiver 108 is rotating.

Each segment can include one or more elements 130 that are particularly configured to receive radiation from a ground-based or satellite-based source. In representative embodiments, the elements 130 are microelectronic components, and can be distributed by the thousands over the surfaces of the receiver 108. For purposes of illustration, the elements are shown schematically in FIG. 2 as stippling. Representative functions performed by the elements 130 are described further below.

In representative embodiments, each receiver segment 114 can include small spiral elements that receive circularly polarized microwave radiation. For example, a phased array transmitter on the ground can direct a beam of microwaves up to the vehicle. The operator may want the ground transmitter to send its beam only when it is locked on the vehicle (and more specifically, on the receiver 108) to avoid the beam hitting unintended targets, such as conventional airplanes, and to avoid wasting power by directing the beam when the vehicle is not positioned properly to receive the microwave energy. A 'pilot' beam, reflected back (e.g., from the receiver 108) can be used to determine when the receiver 108 is properly positioned. A ground-based detector is configured to distinguish between the upwardly directed beam radiation (transmitted from the ground) and the downwardly directed pilot beam radiation (reflected by the vehicle). The elements 130 can be used to generate a downwardly directed pilot beam that has a different polarity than the upwardly directed beam. For example, the upwardly directed power beam can have a right-hand circularized polarity, and the downwardly directed pilot beam have a left-hand circularized polarity. In other embodiments, the elements 130 carried by the receiver 108 can perform a phase lag on the pilot beam when it is reflected back to the ground.

The received energy can be directed to metamaterials to condition and store the energy. For example, the elements 130 can include diodes and/or capacitors to condition and/or store the energy. In particular embodiments, the electrical energy can be collected and used directly to heat a reaction mass at the propulsion system 104 (FIG. 1A). For example, the received microwave energy can be converted to electrical energy (with associated conversion losses), and the electrical energy can be used to heat the reaction mass. In other embodiments, the energy can be re-radiated or re-transmitted directly to the reaction mass, for example, via an oppositely polarized set of spiral elements. Accordingly, instead of converting the received energy to electrical current, the elements 130 in the rotating receiver 108 can reflect the incoming microwaves, focusing them down to a small volume inside the thrust chamber, as described further later. This process can be performed dynamically on the spinning receiver 108, with an individual element varying its angle of reflection as it spins to keep all reflected energy focused on the small volume. The effect of the multitude of elements 130 on the receiver 108 focusing on a small volume while they spin can therefore be to maintain the focus of the overall beam on, for example, the thrust chamber, where air is heated to propel the vehicle.

In still further representative embodiments, the elements 130 can be configured to focus or redirect the received energy, for example, via a Fresnel lens-type arrangement. For example, a representative Fresnel lens can include lines etched in a lens medium, forming a flat fisheye lens. This approach can produce a lens having a relatively small height or cross-sectional dimension, compared to a conventional lens, while still efficiently focusing incoming microwaves on a specific point, such as at the reaction chamber in the engine. The smaller cross-section can reduce the aerodynamic profile of the receiver 108, thereby reducing drag, increasing lifting surface performance, and/or reducing weight. Accordingly, the elements 130 can correspond to etched (or otherwise formed) portions that, when taken together, form an overall Fresnel reflector or Fresnel lens having a diameter on the order of the diameter of the receiver 108.

In yet further embodiments, the elements 130 can produce a phase lag that is controlled to redirect the radiation. Accordingly, the radiation can be received from one direction (e.g., from a ground-base or satellite-based energy source) and redirected in another direction (e.g., toward the propulsion system 104 shown in FIG. 1A).

In general, the receiver 108 can be rotated at rates sufficiently low to keep the rim 112 at subsonic Mach numbers during subsonic flight. The radius of the receiver can be large (e.g., about 16 meters in diameter) to facilitate capturing large amounts of energy.

In any of the foregoing embodiments, and as shown in FIG. 2, individual receiver segments 114 can be twisted or otherwise moved relative to the hub 110 to expose a leading edge 116 and a trailing edge 118. In a particular embodiment, the trailing edge 118 is fixed relative to the hub 110, and the leading edge 116 is twisted upwardly relative to the hub 110. When the receiver 108 is rotated clockwise, as indicated by arrow A, air passing over the receiver 108 generates lift. When the receiver 108 is rotated counter-clockwise, as indicated by arrow B, or if the leading edge 116 is twisted downwardly relative to the hub 110, the receiver can generate a downward force on the vehicle.

The rotating receiver can also provide pitch and roll to the vehicle, by (a) tilting the rotating receiver on its axis at an angle to the fuselage, and/or (b) opening and closing the receiver slats while rotating through one side of the circle of rotation but not on the other side of the circle.

Rotating Receiver can Provide Lift in Horizontal Flight

The rotating receiver can also be used as a wing to provide lift to the vehicle in level flight. For example, the receiver segments can be twisted or otherwise moved to a neutral (closed) position. In this position the receiver's rotation does not produce downward thrust. Instead, while the vehicle is moving laterally (e.g., forward), the receiver provides a lift force to the vehicle similar to the way in which a wing or autogyro lifts a vehicle in horizontal flight.

Figure 3:
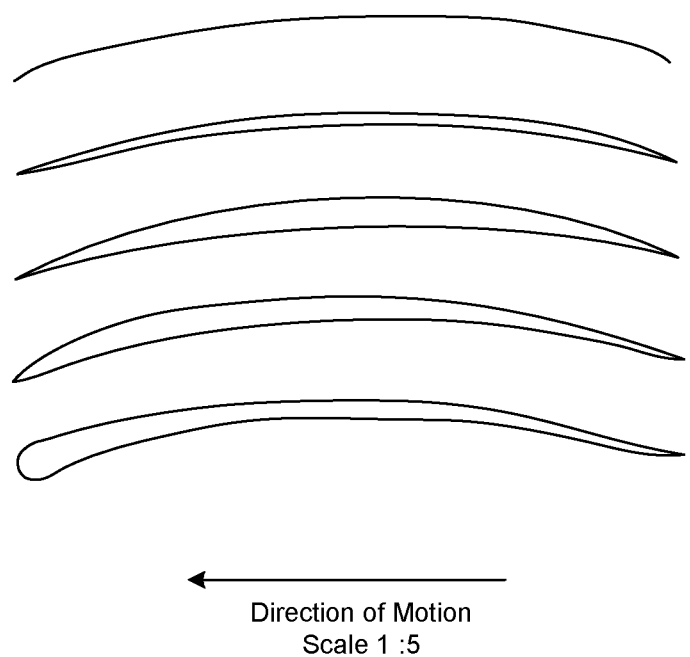
FIG. 3 illustrates representative airfoils that may be used for the receiver segments shown in FIG. 2.

Each receiver segment 114 can have any of a number of suitable cross-sectional shapes, for example, the shapes illustrated in FIG. 3. In general, each receiver segment 114 will have some thickness at the leading edge to survive contact with insects, dust, and other debris during normal use. Individual receiver segments 114 can be positioned and configured in the manner described above, using a twisting action in which the trailing edge remains generally fixed. In other embodiments, the trailing edge can move, in addition to, or in lieu of moving the leading edge. In many of these embodiments, it is generally considered beneficial to provide the actuators at or near the hub 110 rather than the rim 112, where the tip velocity and cantilevered location make integration of actuators more difficult.

Rotating Receiver for Conversion of Electromagnetic Energy

Embodiments of the presently disclosed technology include a rectenna receiver that can be used to convert an electromagnetic energy transmission (such as microwaves) into electricity. The electricity can then be used to power devices on board the aircraft, including propellers to generate thrust for the aircraft.

Rotating Receiver for Reflection of Electromagnetic Energy

Embodiments of the presently disclosed technology include a receiver that can reflect and focus an electromagnetic energy transmission (such as microwaves) onto a smaller area, such as to heat a reaction mass for propulsion. In this embodiment, the receiver acts as a steerable reflector of the incoming electromagnetic energy.

Rotating Receiver for Focusing Refracted Electromagnetic Energy

Embodiments of the presently disclosed technology include a receiver that can affect the transmission of electromagnetic energy (such as microwaves) passing through it, by selective phase delay, so that the transmitted energy is refracted and focused on to a smaller area, such as to heat a reaction mass for propulsion. In this embodiment, the receiver acts as a steerable refractor of the incoming electromagnetic energy. In a particular aspect of this embodiment, the refracted energy is directed to a position above the receiver, e.g., the propulsion system (and fuselage) can accordingly be positioned above rather than below the receiver.

Tracking Beam

Embodiments of the presently disclosed technology include use of a tracking beam established between the aircraft's on-board receiver and the off-board transmitter. This tracking beam is used to guide the direction of the main power beam transmitter during the aircraft's flight. If the tracking beam loses track (signal lock) with the aircraft receiver, the transmitter automatically shuts off the main power beam to the aircraft. This avoids both (a) exposing other vehicles and satellites to the beam when the target receiver is not blocking the beam, and (b) wasting electricity powering a beam that is not powering the aircraft, as discussed above.

Vehicle

Embodiments of the presently disclosed technology include a vehicle that can carry humans. In another embodiment, the vehicle can have no humans on board, and can instead fly using autonomous on-board controls or using instructions relayed from another location such as the ground. In both embodiments, the vehicle can receive power from one or more off-board sources (e.g., a ground-based and/or a space-based source), and can use the power for propulsion.

In particular embodiments, vehicles having the foregoing configuration can be used to fly at supersonic Mach numbers, and more particularly, at hypersonic Mach numbers, e.g., from Mach 5 to Mach 16. Such vehicles can travel from New York to Los Angeles in less than an hour. In addition, the vertical take-off and landing capability of such vehicles can be used to land the vehicles at a much wider range of locations than large airports, including building roof tops.

Power transmission takes place on licensed ISM bands. Higher frequencies permit small antennas at the transmitter, the receiver, or both. As frequencies increase, the energy is attenuated by the atmosphere, and above 10 GHz are strongly scattered by cloud and/or rain, so that in practice, the (nominal) 2.45 GHz and/or 5 GHz bands are typically more practical for use in the present technology.

OTHER EMBODIMENTS

From the foregoing, it will be appreciated that specific embodiments of the disclosed technology have been described herein for purposes of illustration, but that various modifications may be made without deviating from the technology. For example, particular embodiments of the technology may be applied to vehicles and/or systems other than those described herein. Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

Many embodiments of the technology described herein may take the form of computer- or controller-executable instructions, including routines executed by a programmable computer or controller. For example, a computer or controller can control motion-based aspects of the receiver, including the rotation rate, the actuation of the movable segments of the receiver, and/or other functions. The computer or controller can also control the functions carried out by the elements 130 described above, in addition to or in lieu of controlling the motion and/or aerodynamics of the of the receiver. Those skilled in the relevant art will appreciate that the technology can be practiced on computer/controller systems other than those shown and described herein. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palmtop computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

As used herein, the phrase "and/or" as in "A and/or B" refers to A alone, B alone, and both A and B. In the event that any materials incorporated herein by reference conflict with the present disclosure, the present disclosure controls.

The invention claimed is:

1. A method for operating an aircraft, comprising:
rotating an electromagnetic energy receiver aboard the aircraft to provide centripetal force on the receiver to support the receiver in a selected shape and/or orientation, wherein the aircraft includes a fuselage and a propulsion system, and wherein the receiver is operatively coupled to the fuselage, further wherein the receiver is configured to receive energy directed to it from off-board the aircraft, and direct the energy to the propulsion system, the receiver being rotatable relative to the fuselage and including a plurality of moveable segments having an airfoil shape.

2. The method of claim 1 wherein the aircraft is in flight.

3. The method of claim 2 wherein a separate tracking beam is used to track a location of the aircraft as it moves in flight, and wherein the method further comprises decreasing the power of an electromagnetic energy beam when it is not aimed at the same location as the aircraft's receiver.

4. The method of claim 2 wherein the receiver has openings and wherein rotating the receiver includes providing thrust.

5. The method of claim 4 in which the receiver is used to collect electromagnetic energy beamed to the aircraft.

6. The method of claim 4 wherein the thrust is provided generally downward to provide lift to the vehicle.

7. The method of claim 6 wherein the thrust is greater than the weight of the aircraft to cause the aircraft to ascend.

8. The method of claim 6 wherein the thrust is approximately equal to the weight of the aircraft to cause the aircraft to hover.

9. The method of claim 6 wherein the thrust is less than the weight of the aircraft to slow the descent of the aircraft.

10. The method of claim 6 wherein an angle between the rotating receiver and the aircraft fuselage can be varied to provide pitch and roll control.

11. The method of claim 4, further comprising at least partially closing the openings to provide lift in horizontal flight.

12. The method of claim 4, further comprising at least partially closing the openings to provide lift in horizontal flight.

13. An aircraft system, comprising:
an aircraft, having:
a fuselage;
a propulsion system; and
a receiver operatively coupled to the fuselage, the receiver being configured to receive energy directed to it from off-board the aircraft, and direct the energy to the propulsion system, the receiver being rotatable relative to the fuselage and including a plurality of movable segments having an airfoil shape.

14. The aircraft system of claim 13 wherein the movable segments are positionable to direct thrust downwardly.

15. The aircraft system of claim 13 wherein the receiver includes a plurality of distributed energy storage elements.

16. The aircraft system of claim 13 wherein the receiver includes at least one Fresnel lens positioned to redirect incoming energy to the propulsion system.

17. The aircraft system of claim 13, further comprising a beam energy source positioned to direct energy to the receiver.

18. The aircraft system of claim 17 wherein the beam energy source is ground-based.

19. The aircraft system of claim 17 wherein the beam energy source is space-based.

* * * * *

UNITED STATES PATENT AND TRADEMARK OFFICE
CERTIFICATE OF CORRECTION

PATENT NO. : 11,077,938 B1
APPLICATION NO. : 15/870547
DATED : August 3, 2021
INVENTOR(S) : Jeffrey Greason Page 1 of 1

It is certified that error appears in the above-identified patent and that said Letters Patent is hereby corrected as shown below:

In the Specification

In Column 6, Line 15, delete "of the of the" and insert -- of the --, therefor.

Signed and Sealed this
Thirty-first Day of May, 2022

*Katherine Kelly Vidal*

Katherine Kelly Vidal
*Director of the United States Patent and Trademark Office*